United States Patent [19]

Vosgien

[11] Patent Number: 4,985,992
[45] Date of Patent: Jan. 22, 1991

[54] METHOD OF MAKING STATOR STAGES FOR COMPRESSORS AND TURBINES, AND STATOR VANES AND VANE ARRAYS PRODUCED THEREBY

[75] Inventor: Michel Vosgien, Creteil, France

[73] Assignee: Societe National d'Etude et de Construction de Moteurs d'Aviation "S.N.E.C.M.A.", Paris, France

[21] Appl. No.: 230,450

[22] Filed: Aug. 10, 1988

[30] Foreign Application Priority Data

Aug. 12, 1987 [FR] France ................. 87 11454

[51] Int. Cl.$^5$ .................. B23P 1/08; B23P 15/00
[52] U.S. Cl. ...................... 29/889.7; 29/558; 415/189; 415/190
[58] Field of Search ............ 415/191, 189, 190, 192, 415/193, 194, 195; 83/651.1; 219/69.13, 69.15, 69.17, 69.12; 204/224 M, 206, 129.55; 29/412, 156.8 B, 156.8 R

[56] References Cited

U.S. PATENT DOCUMENTS

| | | | |
|---|---|---|---|
| 1,597,488 | 8/1926 | Steenstrup | 29/156.8 R |
| 2,221,722 | 11/1940 | General Electric | 29/889.7 |
| 3,314,137 | 4/1967 | Schellens | 29/413 |
| 3,594,536 | 7/1971 | Holroyd | 219/69.17 |
| 3,802,046 | 4/1974 | Watchtell et al. | 29/156.8 R |
| 3,814,893 | 6/1974 | Helms et al. | 219/69.15 |
| 3,963,894 | 6/1976 | Wachtell et al. | 219/18.15 |
| 4,107,504 | 8/1978 | Dinsdale | 219/69.15 |
| 4,195,396 | 4/1980 | Blazek | 164/129 |
| 4,295,785 | 10/1981 | Lardellier | 415/139 X |
| 4,486,642 | 12/1984 | Inoue | 219/69.12 |
| 4,509,238 | 4/1985 | Lee et al. | 219/69.17 |
| 4,746,782 | 5/1988 | Weber | 219/69.12 X |

FOREIGN PATENT DOCUMENTS

| | | |
|---|---|---|
| 0197268 | 10/1986 | European Pat. Off. . |
| 1169926 | 1/1959 | France . |
| 15455 | 11/1926 | Netherlands . |
| 1116580 | 6/1968 | United Kingdom . |

Primary Examiner—Edward K. Look
Assistant Examiner—Hoang Nguyen
Attorney, Agent, or Firm—Oblon, Spivak, McClelland, Maier & Neustadt

[57] ABSTRACT

A stator vane array is made by cutting vane blanks from a machined linear bar having a predetermined trapezoidal section using a wire tool electroerosion machine, the blanks being cut to an outline which conforms to the shape of the head and root portions of each vane. Each blank is then machined by electroerosion or by chemical machining to form the back and the face of the blade of the vane, and after carrying out finishing operations the vanes are butt-welded together edge to edge to form a complete annular array or a sector thereof. The method is particularly applicable to the manufacture of stator arrays for turbomachine compressors in which the stator vanes have blades with an evolutive profile.

13 Claims, 2 Drawing Sheets

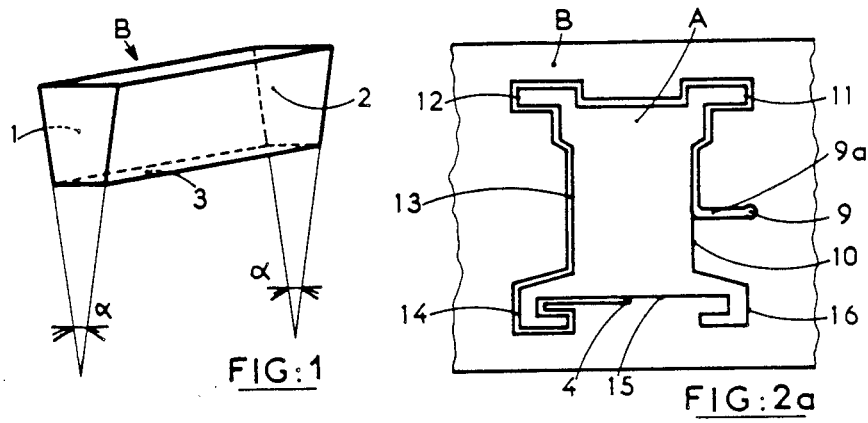
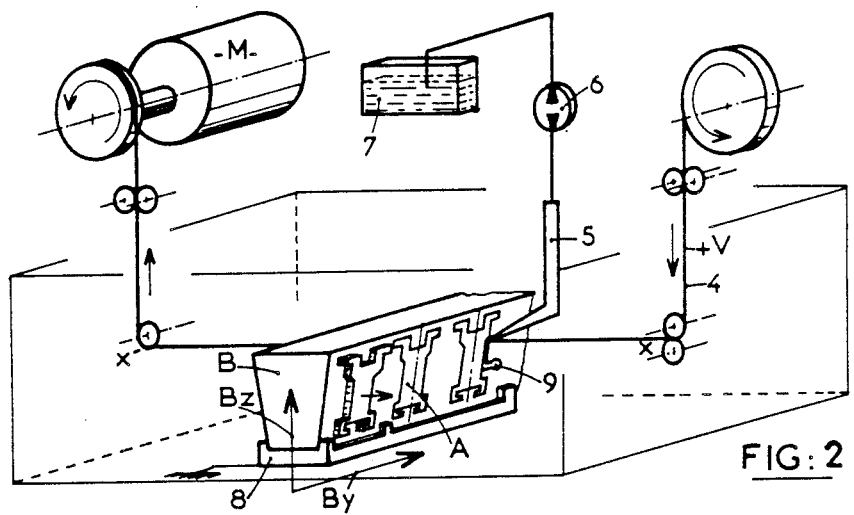
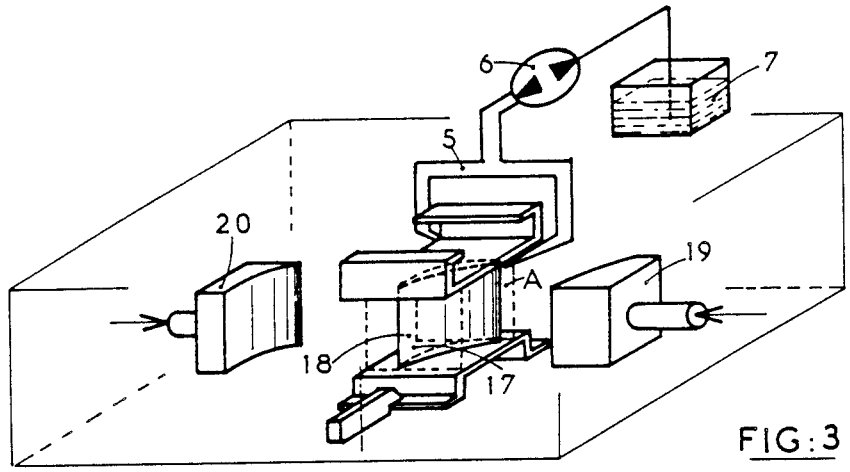

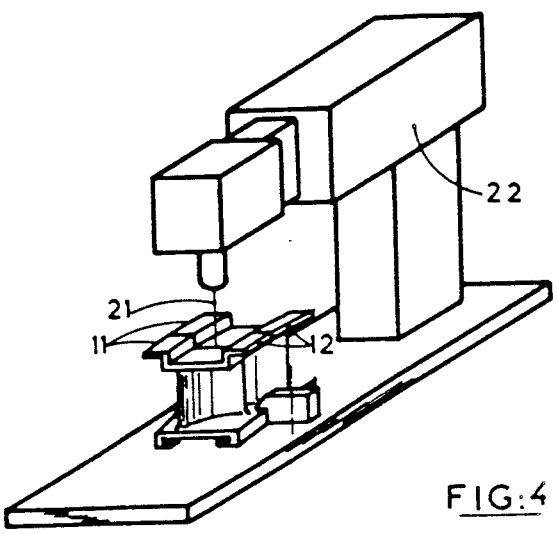
FIG:4
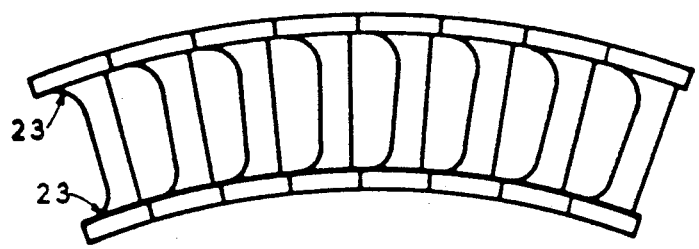
FIG:6
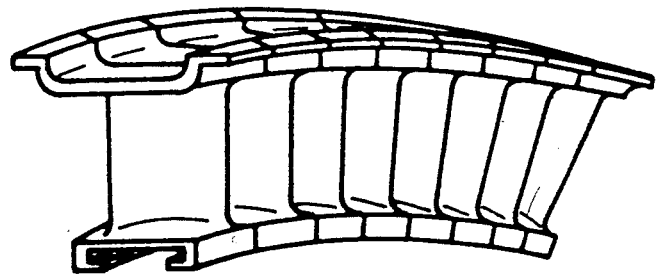
FIG:5

METHOD OF MAKING STATOR STAGES FOR COMPRESSORS AND TURBINES, AND STATOR VANES AND VANE ARRAYS PRODUCED THEREBY

BACKGROUND OF THE INVENTION

1. Field of the Invention

The present invention relates to a method of making a stator vane array for the compressor or turbine of a turbomachine, as well as to the vane units and arrays or array sectors which are thus produced.

2. Summary of the Prior Art

The flow straightener stator stages of high pressure compressors and of turbines are at present made by one or other of two methods.

In the first method the flow straighteners consist of vanes which are cut to shape and assembled in sectors by brazing in punched rings. The machining of the blades is carried out on extruded bars from which a root is cut. The rings themselves are formed by rolling, and then punched. The assembly is effected by brazing the roots in the cut sections of the inner ring and brazing the upper ends of the blades in the cut sections of the outer ring.

This method has a degree of simplicity but its major drawback is that it only permits the manufacture of flow straighteners having blades of simple shape with cylindrical profiles, i.e. of which all the generatrices are parallel to each other.

However, the aerodynamic stresses suffered by the flow straighteners of compressors in high compression rate and high output turbomachines have resulted in seeking to make the flow straightener blades with an evolutive profile and chord. Thus, the blades may have curved ends for transition with the inner and outer rings.

It is not feasible to make such flow straighteners by the above-described method. Thus, a second method of construction is used which consists of casting, by the lost wax process, a complete array, or sectors which will be assembled together to form an array. This method, although enabling complex parts to be made, has all the drawbacks of precision casting. Accordingly it requires making a model of the array or of the sectors by assembling models of the individual blades with the inner and outer rings or ring sectors. From this model a shell mould is made by building up successive layers of ceramic on the model, destroying the model by melting, and then firing the shell mould. The molten alloy from which the array is to be made is then poured into the shell mould, and after solidification of the alloy the mould must be destroyed in order to recover the cast blank of the array or sector. The blank is then subjected to machining of the circular bearing surfaces, and, in the case of sectors, a machining of the side faces, before arriving at the finished array or sector.

This method involves considerable manufacturing stages (typically taking more than 8 months). Also, it makes use of costly industrial means (vacuum melting furnaces, furnaces for firing the shell moulds), the investment in which is justified only for substantial volumes of production.

The object of the present invention therefore is to provide an alternative method for the manufacture of flow straightener stages for high pressure compressors, or turbines, which requires the use of only "light" industrial means compared with those used in casting and also makes it possible to reduce the length of the manufacturing cycle, while enabling the blades to be made with an evolutive profile and chord.

SUMMARY OF THE INVENTION

According to the invention, there is provided a method of making an array of flow straightener vanes for a compressor or turbine stator of a turbo-machine, comprising the following steps:

(a) forming a milled bar having an isosceles trapezoidal section with an apical angle $\alpha$ equal to $2\pi/n$ where n is the number of vanes in the array to be made;

(b) cutting vane blanks from the bar by cutting, perpendicularly to the plane of symmetry of the bar, the outline shape of each vane blank taken across the thickness of the blank between its upstream and downstream edges with respect to the array to be made, the outline including an outer cut-out of the vane root;

(c) machining each vane blank to form the back and the face of the blade of the vane;

(d) carrying out finishing operations on each vane thus formed;

(e) welding the vanes edge to edge to form a sector or a complete annular array; and, (f) carrying out further turning operations on the annular bearing surfaces at the head and root of the formed sector or array.

BRIEF DESCRIPTION OF THE DRAWINGS

FIG. 1 is a diagrammatic view of a bar as formed in step (a) of the method;

FIG. 2 illustrates diagrammatically an example of step (b) of the method in which blade blanks are cut out from the bar;

FIG. 2a is an enlarged view of part of the bar showing the cutting of the outline of a blade blank;

FIG. 3 shows diagrammatically an example of stage (c) of the method;

FIG. 4 illustrates an example of step (e) in which the vanes are welded together;

FIG. 5 is a view of a sector of a flow straightener array made by the method; and FIG. 6 is a view, from an upstream position, of a sector with the blades of the vanes having an end curvature.

DESCRIPTION OF THE PREFERRED EMBODIMENTS

In the first stage of the process (FIG. 1) a rolled bar B made of a suitable alloy, for example a nickel-based superalloy such as that known under the trade name INCO 718 or WASPALLOY, has three of its faces machined by milling so as to provide the bar with an isosceles trapezoidal section in which the two opposite inclined faces 1 and 2 lie in planes which include an angle $\alpha$ at the apex such that $\alpha$ is equal to $2\pi/n$ where "n" is the number of the vanes in the array which is to be made. The third machined face 3, which in this case is the smaller parallel face of the bar, will serve as a reference surface when carrying out the further machining operations of the process.

Since the faces 1 and 2 constitute the Joining surfaces of the vanes after their machining, the cutting out of the vanes, or more exactly their outline shape, is effected perpendicularly to the plane of symmetry of the trapezoidal bar B by means of a wire electroerosion machine (FIG. 2). In accordance with this known machining technique an electric arc is produced between a tool wire 4 subjected to an electric current of positive voltage V and high intensity, and the part which thus undergoes anodic erosion, while a liquid dielectric, for example a nonconductive oily compound, is projected under pressure onto the working area by a nozzle 5 supplied by a pump 6 from a tank 7, the different parameters being determined by the machining conditions required for the chosen alloy of the part. The trapezoidal bar B is fixed on a support 8 movable along two mutually perpendicular axes By and Bz lying in the plane of symmetry of the bar B and, in the example shown in FIG. 2, perpendicular to the axis x—x' of the wire 4 passing through the bar.

To facilitate the cutting out of the outline shape of each vane blank, the movable support 8 of the bar B is motor driven under the control of a microprocessor having a memory in which y and z movements of the support have been programmed so that the bar B is moved according to the outlines to be cut out by the wire 4.

As shown in FIG. 2a, which is a view of the bar B along the axis x—x', a hole 9 is drilled through the bar so that the wire can be passed through the bar. The hole 9 is drilled at a distance far enough from the outline to be cut so that during travel along the path 9a from the insertion hole 9 to the start of the outline, the operating conditions (feed rate, voltage, current intensity, dielectric pressure) stabilize in such a way that the surface condition of the cut at the outline of part A is correct and repetitive.

In the arrangement shown in FIG. 2a the outline of the part to be cut out comprises the side 10 which will form the trailing edge of the blade when completed, the portions 11 and 12 which will form the downstream and upstream edges respectively of the head of the vane, the side 13 which will form the leading edge of the blade, and the portions 14,15,16 which will form respectively the upstream edge, an inner groove, and the downstream edge of the vane root. The purpose of the inner groove 15 is to assist in maintaining a support for a wearable sealing member on the flow straightener array which will be made.

Cutting out by wire electroerosion permits, once the operating conditions have become stabilized during the travel 9a, working to the finished dimensions, particularly in the region of the portions 11,12 of the head and the portions 14,15,16 of the root of the vane.

When the vane blank A has been fully cut out it can be removed from the bar, having at that moment a shape cut out to the outline of the vane, but still with a trapezoidal section.

The next operation consists of machining from the bulk of this section the face 17 and the back 18 of the blade portion of the vane. This is carried out by arranging the blank A in the vat of an electroerosion machine (FIG. 3) of which the tool will have a shape conjugate with that (face or back) of the blade to be machined. The operations of machining the face and the back of the blade may be carried out one after the other, or simultaneously by using two electrodes 19,20 operating in opposition on both sides of the blank, as shown diagrammatically in FIG. 3.

Alternatively, this machining stage may be carried out by electrochemical machining, under working conditions which are known per se for this type of machining.

Finishing operations are then carried out on the vane obtained after the machining of the blade faces. These operations comprise a finishing of the leading and trailing edges of the blade by means of a rotating endless band of abrasive cloth or a grinding wheel, as well as a tumbling of parts to effect deburring. A surface hardening chemical treatment may also be carried out at this stage.

The individual vanes thus made are then assembled in pairs or in sectors and are welded edge to edge at the heads of the vanes, which form the outer ring of the sector. The vanes are welded together at a welding station (FIG. 4), for example by means of an energy beam 21 such as generated by a YAG 22 laser, this being particularly suitable on account of its high setting precision allowing perfect reproducibility of welding as well as being well adapted to butt welding without deposition of metal. This type of welding induces little deformation in the parts to be assembled because of the limited heating it causes. Vacuum electron beam welding is also suitable for welding the vanes together, and may be used instead of laser welding if desired.

A final operation will consist of further turning of the circular bearing surfaces at the head and root of the assembled flow straightener array.

Sectors which may be made are shown in FIGS. 5 and 6, FIG. 6 showing a particular type of vane arrangement which can be achieved by means of the invention. For aerodynamic reasons the blades of these vanes are provided with end curves 23 at the transitions with the head and root of the vane, and may also have an evolutive sectional profile along the length of the blade. The invention relates also to complete vane arrays which are made as indicated above.

The method which has just been described enables a reduction of from 4 to 6 months to be achieved in the manufacturing cycle compared with the methods at present in use. In addition it is adapted perfectly well to medium production volumes as it does not involve using heavy industrial means.

What is claimed is:

1. A method of making an array of flow straightener vanes for a compressor or turbine stator of a turbomachine, each vane including a root, a blade and a head, said method comprising the following steps:
  (a) milling a bar to provide said bar with an isosceles trapezoidal section having an apical angle $\alpha$ equal to $2\pi/n$ where n is the number of vanes in said array to be made;
  (b) cutting vane blanks from said bar by cutting, perpendicularly to the plane of symmetry of said bar, the outline shape of each vane blank taken across the thickness of said blank between its upstream and downstream edges with respect to said array to be made, whereby said outline defines the head and the root of the vane, said root including an outer cut-out;
  (c) machining each vane blank to form the back and the face of the blade of the vane;
  (d) carrying out finishing operations on each vane thus formed;
  (e) welding said vanes edge to edge to form a sector or a complete annular array; and,
  (f) carrying out further turning operations on the annular bearing surfaces formed by said heads and said roots of said vanes in said sector or array.

2. A method according to claim 1, wherein said cutting of said vane blanks from said bar is carried out by electroerosion.

3. A method according to claim 2, wherein said vane blanks are cut out using a wire-tool electroerosion machine.

4. A method according to claim 1, wherein said outline shape of each vane blank is cut to finished dimensions.

5. A method according to claim 1, wherein said machining of each vane blank to form said face and said back of said vane blade is effected by electroerosion.

6. A method according to claim 1, wherein said machining of each vane blank to form said face and said back of said vane blade is effected by electrochemical machining.

7. A method according to claim 1, wherein said finishing operations carried out on each vane comprise a finish grinding of the leading and trailing edges of said blade of said vane and a tumbling operation.

8. A method according to claim 1, wherein said welding of said vanes to each other is carried out using an energy beam.

9. A method according to claim 1, wherein said vanes are welded to each other at the heads thereof.

10. A stator vane for a compressor or turbine, said vane being made by a method according to steps (a) to (d) of claim 1, and said blade of said vane having an evolutive profile.

11. A stator vane for a compressor or turbine, said vane being made by a method according to steps (a) to (d) of claim 1, and said blade of said vane having at each of its ends a curved transition with said head and said root of said vane respectively.

12. A stator array for a compressor or turbine of a turbo-machine, comprising a plurality of vanes according to claim 10 welded edge to edge to form said array.

13. A stator array for a compressor or turbine of a turbo-machine, comprising a plurality of vanes according to claim 11 welded edge to edge to form said array.

* * * * *